(12) United States Patent
Kouyama

(10) Patent No.: US 7,187,955 B2
(45) Date of Patent: Mar. 6, 2007

(54) FOLDABLE PORTABLE TELEPHONE SET

(75) Inventor: Naoyuki Kouyama, Saitama (JP)

(73) Assignee: NEC Corporation (JP)

( * ) Notice: Subject to any disclaimer, the term of this patent is extended or adjusted under 35 U.S.C. 154(b) by 848 days.

(21) Appl. No.: 09/804,570

(22) Filed: Mar. 12, 2001

(65) Prior Publication Data
US 2001/0023196 A1 Sep. 20, 2001

(30) Foreign Application Priority Data
Mar. 14, 2000 (JP) .............................. 2000/076402

(51) Int. Cl.
H04M 1/00 (2006.01)
(52) U.S. Cl. .................. 455/575.3; 455/567; 455/569.1
(58) Field of Classification Search ............... 455/90.3, 455/575.7, 566, 507, 580, 425, 565, 414–415, 455/557, 465, 466, 575.3, 567, 550.1, 575.1, 455/575.4, 525.8, 569.1, 95; 379/428–433
See application file for complete search history.

(56) References Cited

U.S. PATENT DOCUMENTS

| 5,404,582 | A | | 4/1995 | Demuro et al. | |
|---|---|---|---|---|---|
| 6,094,565 | A | * | 7/2000 | Alberth et al. | 455/575.3 |
| 6,597,279 | B1 | * | 7/2003 | Haraguchi | 340/7.2 |
| 6,807,433 | B2 | * | 10/2004 | Oota et al. | 455/566 |

FOREIGN PATENT DOCUMENTS

| GB | 2 277 851 A | 11/1994 |
|---|---|---|
| GB | 2 314 188 A | 12/1997 |
| GB | 2 328 347 A | 2/1999 |
| GB | 2 339 648 A | 2/2000 |
| JP | 1-85454 | 3/1989 |
| JP | 64-080145 | 3/1989 |
| JP | 08-307488 | 11/1996 |
| JP | 11-088483 | 3/1999 |
| JP | 2001 211241 | 10/2003 |

OTHER PUBLICATIONS

Japanese Office Action issued Aug. 30, 2004 (w/ English translation of relevant portion).
Japanese Office Action issued Aug. 22, 2005 (w/ English translation of relevant portion).

* cited by examiner

Primary Examiner—Pablo N. Tran
(74) Attorney, Agent, or Firm—Dickstein, Shapiro, LLP.

(57) ABSTRACT

A call tone output system for a foldable portable telephone set having a hinge to be unfolded and folded is disclosed. The call tone output system comprises a detector 14 for detecting the unfolding and folding of the hinge, and a tone output control unit (11 and 20) for causing tone output from a call tone output unit 8, which outputs a call tone at the time of a call arrival, when a call arrives in the folded state of the hinge, and from a receiver, which outputs a reception tone, when the hinge is unfolded from the folded state.

11 Claims, 8 Drawing Sheets

FIG.7

RELATION BETWEEN STATUS AT CALL ARRIVAL TIME
AND TONE OUTPUT PART

| STATUS AT CALL ARRIVAL TIME | TONE OUTPUT PART | ROUTINE |
|---|---|---|
| FOLDED | CALL TONE OUTPUT UNIT 8 (RECEIVER 5 IS ARBITRARILY) | 1 |
| FOLDED → UNFOLDED | RECEIVER 5 (CALL TONE OUTPUT UNIT 8 IS ARBITRARILY) | |
| UNFOLDED | ONLY CALL TONE OUTPUT UNIT 8 | 2 |
| UNFOLDED → FOLDED | CALL TONE OUTPUT UNIT 8 (RECEIVER 5 IS ARBITRARILY) | 3 |
| FOLDED → UNFOLDED | RECEIVER 5 (CALL TONE OUTPUT UNIT 8 IS ARBITRARILY) | 4 |

FIG.8

RELATION BETWEEN STATUS AT KEYBOARD INPUT
AND TONE OUTPUT PART

| STATUS AT KEYBOARD INPUT | TONE OUTPUT PART | ROUTINE |
|---|---|---|
| UNFOLDED | RECEIVER 5 (CALL TONE OUTPUT UNIT 8 IS ARBITRARILY) | 5 |
| FOLDED | CALL TONE OUTPUT UNIT8 (RECEIVER 5 IS ARBITRARILY) | 6 |
| UNFOLDED | RECEIVER 5 (CALL TONE OUTPUT UNIT 8 IS ARBITRARILY) | |

FOLDABLE PORTABLE TELEPHONE SET

BACKGROUND OF THE PRESENT INVENTION

This application claims benefit of Japanese Patent Application No. 2000-076402 filed on Mar. 14, 2000, the contents of which are incorporated by the reference.

The present invention relates to foldable portable telephone sets and, more particularly, to systems for and methods of call tone output in foldable portable telephone sets.

The foldable portable telephone set has a buzzer provided on its outer side in the folded state for outputting a call tone at the time of a call arrival.

Although buzzers have heretofore been used as call tone generator for portable telephone sets, recently they have been increasingly replaced with loudspeakers as disclosed in Japanese Patent Laid-Open No. 1-85454. This trend is thought to be due to unexpectedly great popularity of the portable telephone sets giving rise to measures against noise given by them to nearby people. More specifically, the loudspeaker usually has narrower sound directivity than the sound directivity of the buzzer, and it thus enables directing the call tone at the time of a call arrival to the user and not to nearby people.

The loudspeaker, however, has a problem that it is driven by a loudspeaker drive amplifier (with an input impedance of 4 to 8 ohms), which usually consumes more current than the buzzer (with an input impedance of about 32 ohms.

In addition, with recent trend for reducing sizes of portable telephone sets, the loudspeakers which can be mounted on portable telephones sets usually have small output openings (mainly of 16 mm or below), and their sound pressure is usually low compared to buzzers.

Since power supply batteries are in a trend of reducing size, capacity and weight as noted above, it is extremely difficult to realize current rating reduction of the loudspeaker drive amplifier while ensuring sufficient sound pressure.

SUMMARY OF THE INVENTION

An object of the present invention, accordingly, is to provide a system of and a method for call tone output for a foldable portable telephone set capable of ensuring sound pressure and reducing current rating of the loudspeaker drive amplifier with respect to batteries which are small in size and low in current rating.

In order to achieve the above problems, the present invention provides a call tone output system for a foldable portable telephone set having a hinge for being unfolded and folded, comprising: a detector for detecting the unfolding and folding of the hinge; and a tone output controller for causing the tone output from a call tone output unit, which outputs a call tone upon a call arrival, when a call arrives in the folded state of the hinge and from a receiver, which outputs a reception tone, when the hinge is unfolded from the folded state.

In this case, unfolding the foldable portable telephone set usually makes the display visible. Thus, a call tone that is outputted at the time of a call arrival, generally at relatively low sound level from the receiver provided at the same surface as the display, can be sufficiently monitored. That is, it is possible to reduce the loudspeaker drive amplifier power consumption by switching the loudspeaker in the call tone output unit power to the lower output level loudspeaker in the receiver. It is thus possible to ensure sound pressure and reduce current in the loudspeaker drive amplifier with respect to batteries which are reduced in size and current rating.

Preferably, the tone output controller causes tone output only from the call tone output unit when a call arrives in the unfolded state of the hinge.

In this case, it is possible to eliminate damage to the ear at the time of a call arrival while the user is hearing voice from the receiver.

In this case, it is possible to eliminate damage to the ear at the time of a call arrival while the user is hearing voice from the receiver.

Preferably, the tone output controller continues to cause the tone output from the call tone output unit when the hinge is folded from the unfolded state. Further, the tone output controller causes tone output from the receiver when the hinge is folded from the unfolded state.

In this case, the operation is brought about by the user's intentional action, and the call tone output from only the call tone output unit is unnecessary. In addition, since the intentional action is usually assumed to be done in the visible state of the display, the relatively low level sound from the receiver can be sufficiently recognized. That is, it is possible to reduce the loudspeaker drive amplifier power consumption by switching the loudspeaker in the call tone output unit over to the relatively low output level loudspeaker in the receiver.

Preferably, the tone output controller causes the receiver to output an operation confirmation tone inputted from a keyboard in the unfolded state of the hinge. Further, the tone output controller causes the output of the operation confirmation tone inputted from an external keyboard from the call tone output unit in the folded state of the hinge and from the receiver in the unfolded state of the hinge.

In this case, the action of causing the confirmation tone output is done intentionally. Since this action is also usually done in the visible state of the display, the relatively low level sound from the receiver can be sufficiently recognized. That is, it is possible to reduce the loudspeaker drive amplifier power consumption by switching the loudspeaker in the call tone output unit over to the loudspeaker in the receiver.

Preferably, the tone output controller causes the output from the receiver at the time of the tone output from the call tone output unit. Further, the tone output controller causes tone output from the call tone output unit at the time of the tone output from the receiver.

In this case, the sound pressure of the call tone can be increased.

Furthermore, the present invention provides a call tone output system for a foldable portable telephone set having a hinge to be unfolded and folded, comprising: a receiver provided on the inner side of the foldable portable telephone set and including a loudspeaker for outputting a reception tone; a call tone output unit provided on the outer side of the foldable portable telephone set and including a loudspeaker for outputting a call tone at the time of a call arrival; a tone signal generator for outputting a tone signal to the receiver and also to the call tone output unit; a detector for detecting the unfolding and folding of the hinge; a receiver loudspeaker drive amplifier for driving the loudspeaker in the receiver; a call tone output unit loudspeaker drive amplifier for driving the loudspeaker in the call tone output unit; a receiver switch for turning on and off the output of the tone signal from the tone signal generator to the receiver; call tone output unit switch for turning on and off the output of the tone signal from the tone signal generator to the call tone output unit; a receiver power supply switch for connecting the receiver loudspeaker drive amplifier to a power supply therefor; a call tone output unit power supply switch for connecting the call tone output unit loudspeaker drive amplifier to a power supply therefor; and a switch controller for controlling the receiver switch, the call tone output unit switch, the receiver power supply switch and the call tone output unit power supply switching and causing tone output from the call tone output unit upon arrival of a call in the folded state of the hinge and from the receiver when the hinge is unfolded from the folded state.

In this case, like the above case, it is possible to ensure sound pressure and reduce current in the loudspeaker drive amplifier with respect to batteries which are small in size and low in current rating.

Still further, the present invention provides a call tone output method for a foldable portable telephone set having a hinge to be unfolded and folded, comprising: a step of detecting the unfolding and folding of the hinge; and a step of causing the tone output from a call tone output unit, which outputs a call tone upon a call arrival, when a call arrives in the folded state of the hinge and from a receiver, which outputs a reception tone, when the hinge is unfolded from the folded state.

In this case, like the above case, it is possible to ensure sound pressure and reduce current in the loudspeaker drive amplifier with respect to batteries which are small in size and low in current rating.

The present invention provides a portable telephone set having two member bodies capable of being unfolded and folded, comprising: a detector for detecting the unfolding and folding of the two member bodies; and a tone output controller for causing the tone output from a call tone output unit, which outputs a call tone upon a call arrival, when a call arrives in the folded state of the two member bodies and from a receiver, which outputs a reception tone, when the two member bodies are unfolded from the folded state.

The tone output controller causes tone output only from the call tone output unit when a call arrives in the unfolded state of the two member bodies.

Other objects and features will be clarified from the following description with reference to attached drawings.

BRIEF DESCRIPTION OF THE DRAWINGS

FIG. 7 is a view showing the correspondence relation between the status of the foldable portable telephone set and the tone output part at the call arrival time; and FIG. 8 is a view showing the correspondence relation between the telephone set status and the tone output part when an input is made from keyboard.

PREFERRED EMBODIMENTS OF THE INVENTION

Preferred embodiments of the present invention will now be described with reference to the drawings.

Figure 1:
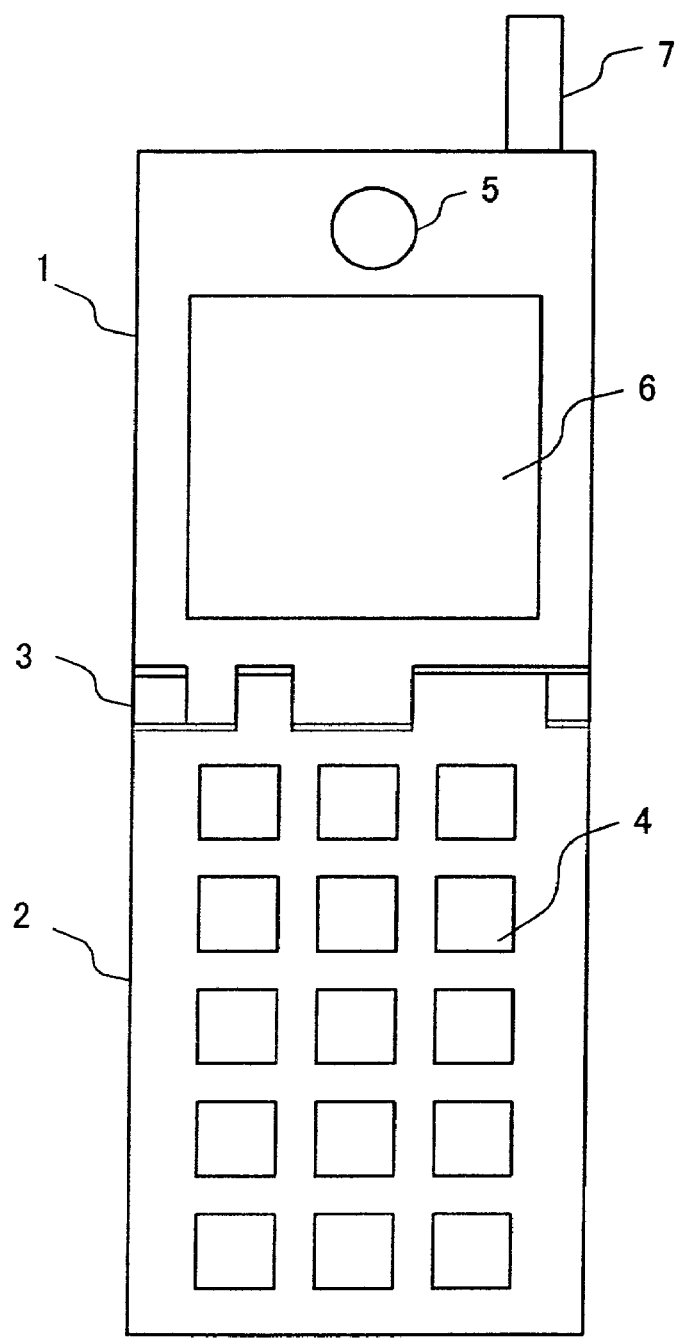
FIG. 1 is a schematic outer view showing a foldable portable telephone set according to the present invention in an unfolded state.

FIG. 1 is a schematic outer view showing a foldable portable telephone set according to the present invention in an unfolded state.

Referring to the Figure, the illustrated foldable portable telephone set comprises box-like casings 1 and 2 mechanically coupled together by a hinge for permitting its folding and unfolding.

The casing 2 has a keyboard 4 provided on its inner surface when the foldable portable telephone set is in the unfolded state. The keyboard 4 is used for inputting telephone numbers and also for operations of various functions. The casing 1 has a receiver 5. The receiver 5 is constituted by a loudspeaker and outputs the opposite party's voice. The casing 1 also has a display 6. The display 6 is constituted by a liquid crystal device (LCD), and displays, the present status, messages, etc. The telephone set further has an antenna 7. The antenna 7 serves for the transmission and reception of signals to and from the base station. When the telephone set is in the folded state, the keyboard 4 and the receiver 5 (and also the display 6) face one another.

Figure 2:
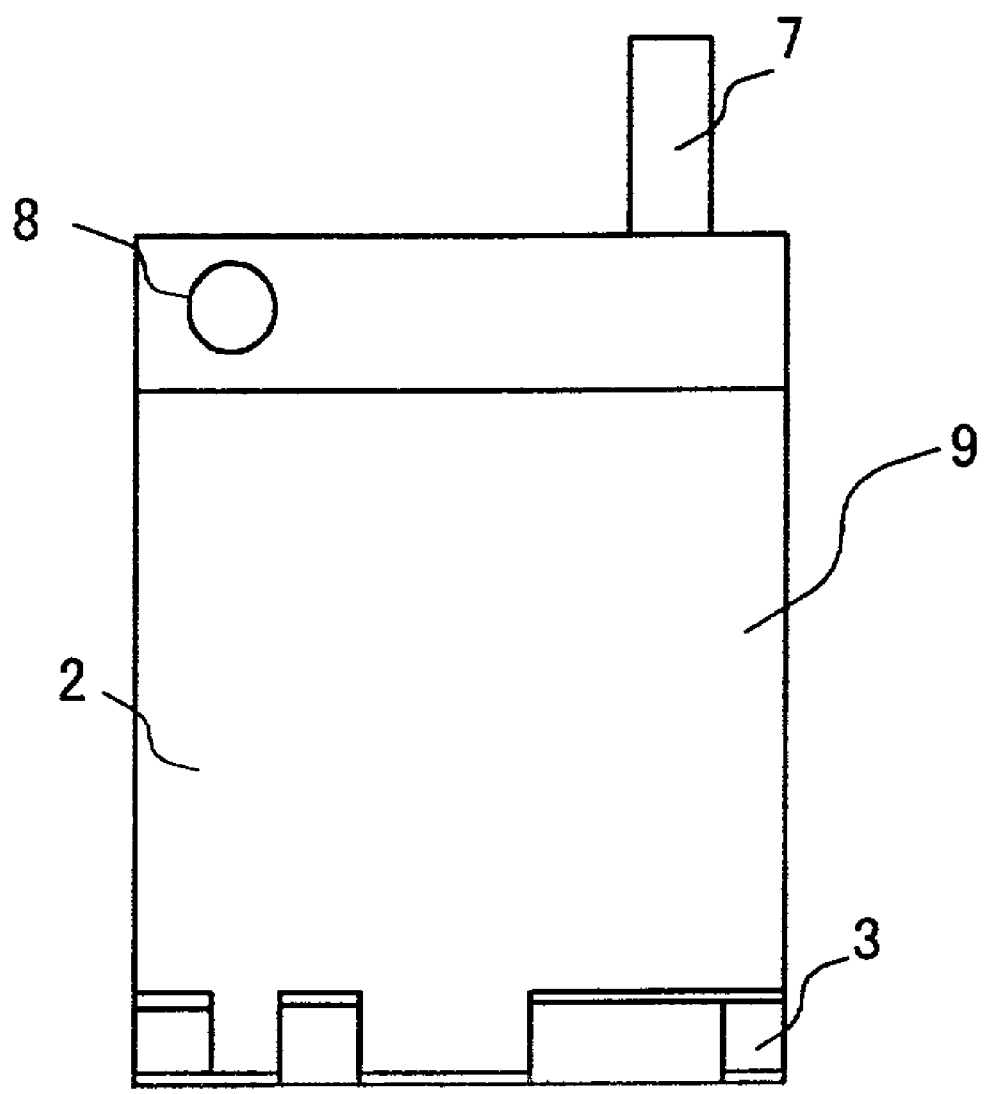
FIG. 2 is a schematic outer view showing a foldable portable telephone set shown in FIG. 1 in a folded state.

FIG. 2 is a schematic outer view showing a foldable portable telephone set shown in FIG. 1 in a folded state.

As shown in the Figure, in the folded state of the foldable portable telephone set the keyboard 4, the receiver 5 and the display 6 are concealed in the inside and can not be directly seen from the outside. The casing 2 has a call tone output unit 8 provided on the outer surface in the folded state of the telephone set. The call tone output unit 8 is constituted by a loudspeaker, and outputs a call tone at the time of arrival of a call. A tone output hole is provided such that it is directed toward the outer surface of the casing 2.

The output level of the loudspeaker of the call tone output unit 8 is set to be higher than the output level of the loudspeaker of the receiver 5 and the sound pressure and consumed current from the call tone output unit 8 is also higher than those of the receiver 5. The foldable portable telephone set has a battery 9 concealed in the casing 2 in its folded state. The battery supplies power to various parts of the telephone set.

Figure 3:
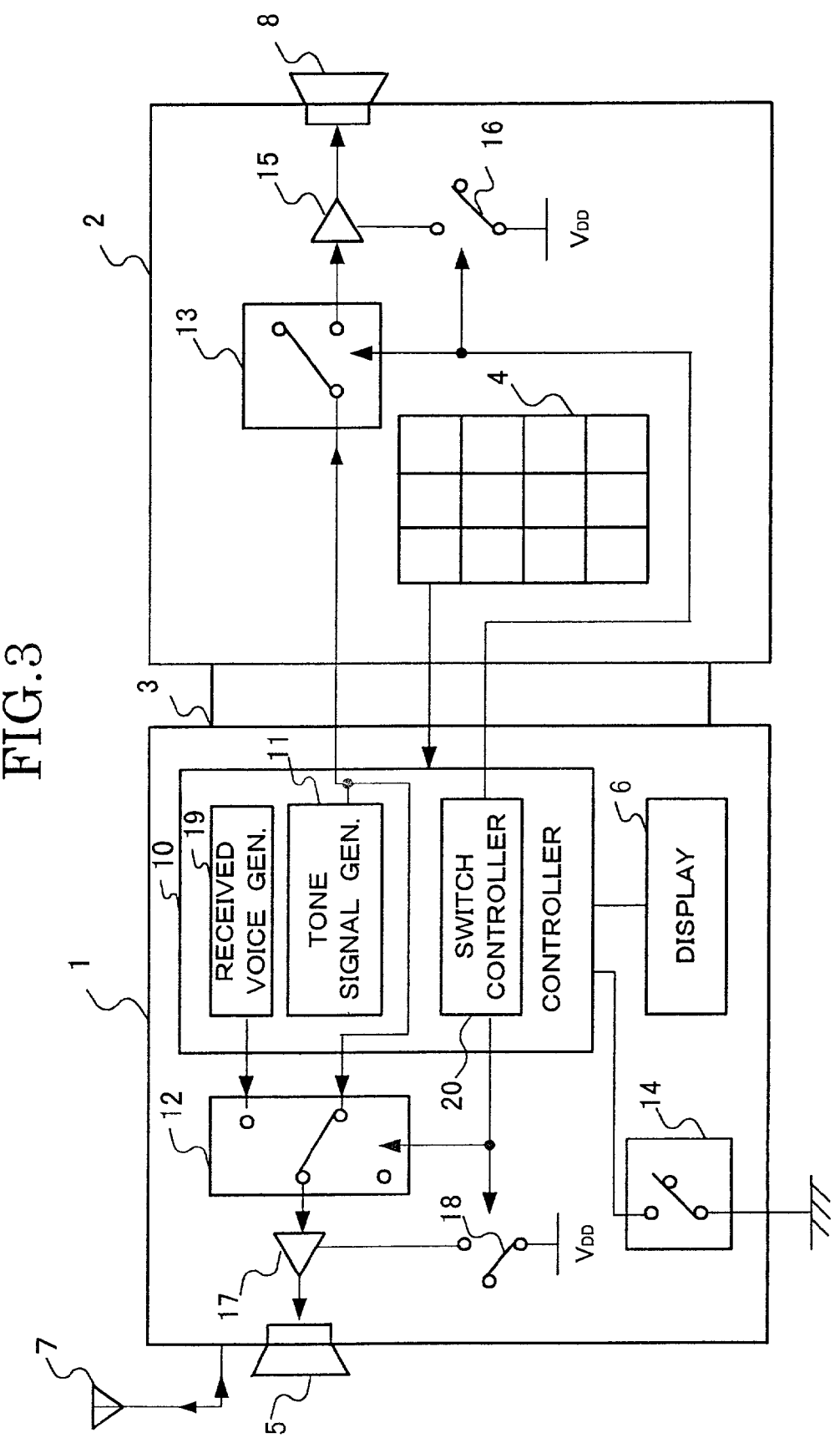
FIG. 3 is a schematic showing a call tone generating system in the foldable portable telephone set according to the present invention.

FIG. 3 is a schematic showing a call tone generating system in the foldable portable telephone set according to the present invention.

As shown in the Figure, the casing 1 of the foldable portable telephone set according to the present invention comprises the call tone generating system, which includes a controller 10. The controller 10 receives various control signals from the keyboard 4, and controls the telephone set, particularly the display on the display 6. The controller 10 includes a tone signal generator 11, a received voice generator 19 and a switch controller 20. The tone signal generator 11 generates a tone signal at the time of a call arrival. The received voice generator 19 generates received voice from a received signal inputted from the antenna 7. The casing 1 has a switch 12. The switch 12 selectively passes either of the outputs of the generators 11 and 19 as input signal to the receiver 5. A loudspeaker drive amplifier 17 is connected to the output side of the switch 12, and drives the loudspeaker as sound generator in the receiver 5.

The casing 2 has a switch 13. The switch 13 on-off controls the output of the call tone generator 11 in the controller 10. A loudspeaker drive amplifier 15 is connected to the switch 13, and drives the loudspeaker sound generator in the call tone output unit 8. The amplifiers 15 and 17 are connected via switches 16 and 18, respectively, to a power supply providing voltage VDD.

The switch controller 20 in the controller 10 controls the switching of the switches 12, 18, 13 and 16. A lead switch 14 is connected to the switch controller 20 in the controller 10. The lead switch 14 checks whether the casings 1 and 2 of the foldable portable telephone set is unfolded or folded via the hinge 3, and feeds out a detection signal as a result of the check to the switch controller 20. The lead switch 14 is not limitative as a means for checking as to the unfolding and folding.

Figure 4:
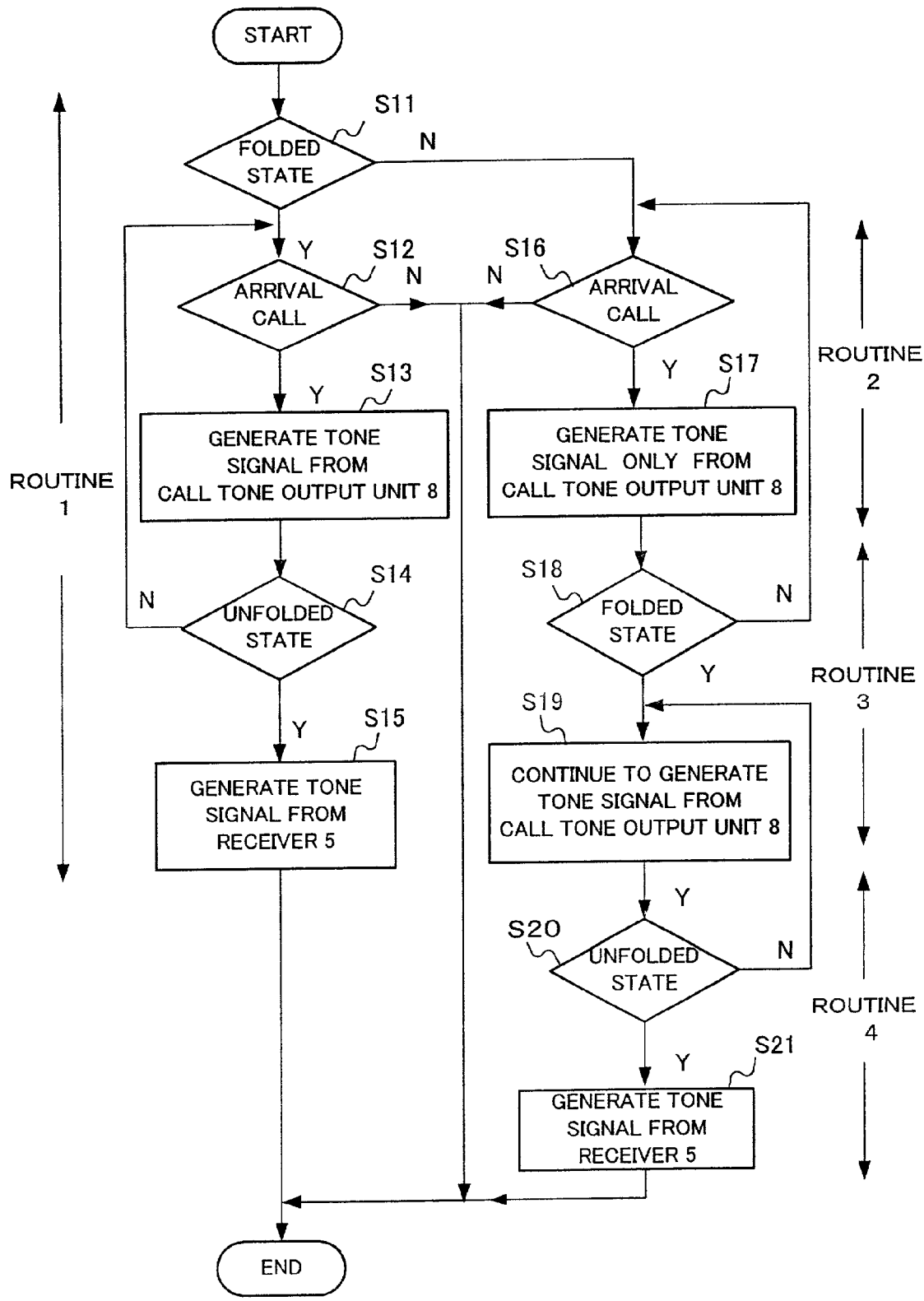
FIG. 4 is a flow chart for describing various examples of operation routine concerning the switch controller 20 in the controller 10 shown in FIG. 3.

FIG. 4 is a flow chart for describing various examples of operation routine concerning the switch controller 20 in the controller 10 shown in FIG. 3.

(Routine 1)

Referring to the Figure, the switch controller 20 in the controller 10 executes a step S11 of checking, according to the detection signal from the lead switch 14, whether the foldable portable telephone set is folded or unfolded via the hinge 3. When the telephone set is in the folded state, the switch controller 20 executes a step S12 of checking whether an arrived call is present. When no arrived call is present, an end is brought to the routine.

When an arrived call is present in the folded state of the foldable portable telephone set, the switch controller 20 turns on the switches 3 and 16, whereby the tone signal generator 11 causes tone output from the call tone output unit 8 (step S13).

More specifically, it is detected that the lead switch 14 is "on" and also that the hinge 3 is in the folded state. The switch controller 20 recognizes these states, and the switch 13 is "on". At this time, the switch 16 is also "on" and carries a current. Thus, upon the call arrival time a call tone is outputted from the call tone output unit 8, which is provided on the outer surface of the casing 2 in the folded state, thus informing the call arrival.

In this case, the call tone output from the receiver 5 is optional. More specifically, the switch controller 20 may switch the switch 12 to the side of the call tone generator 11 and turn on the switch 18. Alternatively, the switch controller 20 may turn off the switches 12 and 18. The call tone output from the receiver 5 is accompanied by an increased sound pressure of the call tone at the call arrival time. Although it is optional to cause the call tone output from the receiver 5 at the call arrival time, preferably it is not done so for the sake of reducing the current consumption in the foldable portable telephone set.

While the call tone is outputted at the call arrival time, the switch controller 20 executes a step S14 of checking, according to the detection signal from the lead switch 14, whether the hinge 3 is in the unfolded state. When the hinge 3 is in the folded state, the routine goes back to the step S12. When the hinge 3 is brought from the folded state to the unfolded state, the switch controller 20 executes a step S15 of switching the switch 12 to the side of the call tone generator 11 and turning on the switch 18, whereby the call tone generator 11 causes the call tone output from the receiver 5.

More specifically, when the hinge 3 is brought from the folded state to the unfolded state, that is, when the lead switch 14 is switched from the "on" state to the "off" state during the call tone output at the call arrival time, the switch controller 20 recognizes this switch state change, and controls the bus of the switch 12 such as to couple the output of the call tone generator 11 to the receiver 5. At the same time, the switch 18 is turned on to cause current through the loudspeaker drive amplifier 17.

In this case, the call tone output from the call tone output unit 8 is optional. Namely, the switch controller 20 may turn on or off the switches 13 and 16. The call tone output from the output unit 8, however, is accompanied by an increased sound pressure of the call tone at the call arrival time. Although it is optional to continually provide the call tone output from the output unit 8 at the call arrival time, preferably it is not done so for the sake of reducing the current consumption in the foldable portable telephone set.

As shown above, Routine 1 has an effect that since unfolding the foldable portable telephone set usually makes the display 6 visible, it permits a call tone that is outputted at the call arrival time, generally at relatively low sound level from the receiver 5 provided at the same surface as the display 6, to be sufficiently recognized. That is, it is possible to reduce the loudspeaker drive amplifier power consumption by switching the loudspeaker in the call tone output unit 8 over to the lower output level loudspeaker in the receiver 5. Further current reduction is obtainable by turning off the power supply to the loudspeaker drive amplifier 15 (i.e., turning off the switch 16).

(Routine 2)

When the hinge 3 is in the unfolded state, the switch controller 20 executes a step S16 of checking whether a call has been arrived. When no call has been arrived, an end is brought to the routine. When a call has been arrived in the unfolded state of the hinge 3, the switch controller 20 executes a step S17 of turning on the switches 13 and 16, whereby the tone signal generator 11 causes tone output from only the call tone output unit 8.

In this case, no tone is outputted from the receiver 5. More specifically, when a call has been arrived in the unfolded state of the hinge 3, the switch 20 recognizes that the lead switch 14 is "off", and thus turns off the switches 12 and 18 while turning on the switches 13 and 16, whereby the receiver 5 outputs no tone and only the call tone output unit 8 outputs a call tone.

As shown above, Routine 2 has an effect that it is possible to eliminate the possibility of a damage caused to the eardrum at the time of a call arrival while the user is hearing voice from the receiver 5. In other words, it is possible to obtain an operation, in which a PL (products liability) rule is taken into considerations.

(Routine 3)

In is routine, while a tone is being outputted, the switch controller 20 executes a step S18 of checking whether the hinge 3 has been folded from the unfolded state. When the hinge 3 remains unfolded, the routine goes back to the step S16. When the switch controller 20 detects that the hinge 3 has been folded from the unfolded state, it executes a step S19 of causing the call tone output unit 8 to continue the tone output. This is done so in order to ensure the sound pressure of the call tone.

In this case, the tone output from the receiver 5 is optional. More specifically, upon detection of the folding of the hinge 3, the lead switch 14 is turned on from the "off" state. At this time, the switch states of the switches 12 and 18 become optional, although the states of the switches 13 and 16 remain unchanged from the states in Routine 2. The tone output from the receiver 5 is accompanied by an increased sound pressure of the call tone at the call arrival time. For the sake of reducing the current consumption in the foldable portable telephone set, the switches are held such as to prohibit the tone call output from the receiver 5.

(Routine 4)

The switch controller 20 further executes a step S20 of checking whether the hinge 3 has been unfolded from the folded state. When the hinge 3 remains folded, the routine goes back to the step S19. When the hinge 3 has been unfolded from the folded state, the switch controller 20 causes the tone output from the receiver 5. In this case, the call tone output from the call tone output unit 8 is optional. In Routines 3 and 4, the action in Routine 2 is unnecessary at this time because the user has conducted an intentional action. The presumed intentional action by the user is usually assumed to be conducted in the visible state of the display 6, and the same effects as in the description of Routine 1 are obtainable.

(Routine 5)

Figure 5:
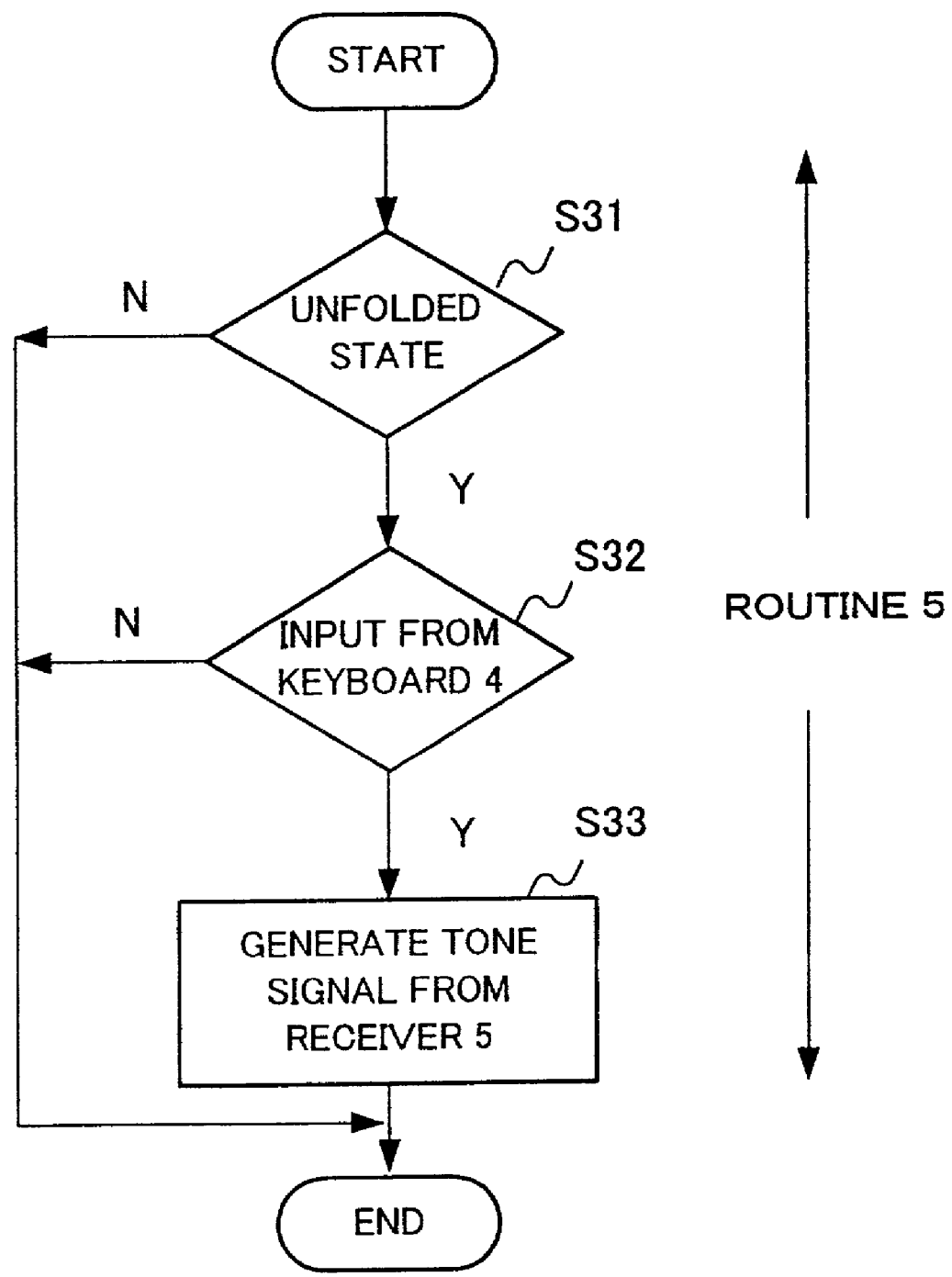
FIG. 5 is a flow chart for describing Routine 5 concerning the switch controller 20 in the controller 10 shown in FIG. 3.

FIG. 5 is a flow chart for describing Routine 5 concerning the switch controller 20 in the controller 10 shown in FIG. 3.

In this routine, the switch controller 20 in the controller 10 executes a step S31 of checking, according to the detection signal from the lead switch 14, whether the hinge 3 is unfolded or folded. When the hinge 3 is in the folded state, an end is brought to the routine.

When the hinge 3 is in the unfolded state, the switch controller 20 executes a step S32 of checking whether an input has been made from the keyboard 4 (or any other external keyboard). When no input has been made, an end is brought to the routine. When an input has been made from the keyboard 4 in the unfolded state of the hinge 3, the switch controller 20 executes a step S33 of causing the tone output from the receiver 5.

In this case, the tone call output from the tone call output unit 8 is optional. More specifically, when the hinge 3 is in the unfolded state, the controller 10 recognizes the input from the keyboard 4, and controls the switches 12 and 18 such as to cause a confirmation tone to be outputted from the receiver 5. As a result, the switches 13 and 16 are rendered to be able to assume optional states. The tone call output from the tone call output unit 8 is accompanied by an increased sound pressure of the call tone at the call arrival time. For the sake of reducing the current consumption in the foldable portable telephone set, the switches 13 and 16 are preferably held "off" to prohibit the call tone output from the tone call output unit 8 at the call arrival time.

Routine 5 is executed in the case of intentionally making the section of outputting the confirmation tone. This action is also usually made in the visible state of the display 6. That is, Routine 1 has the same effects as obtainable in Routine 1.

(Routine 6)

Figure 6:
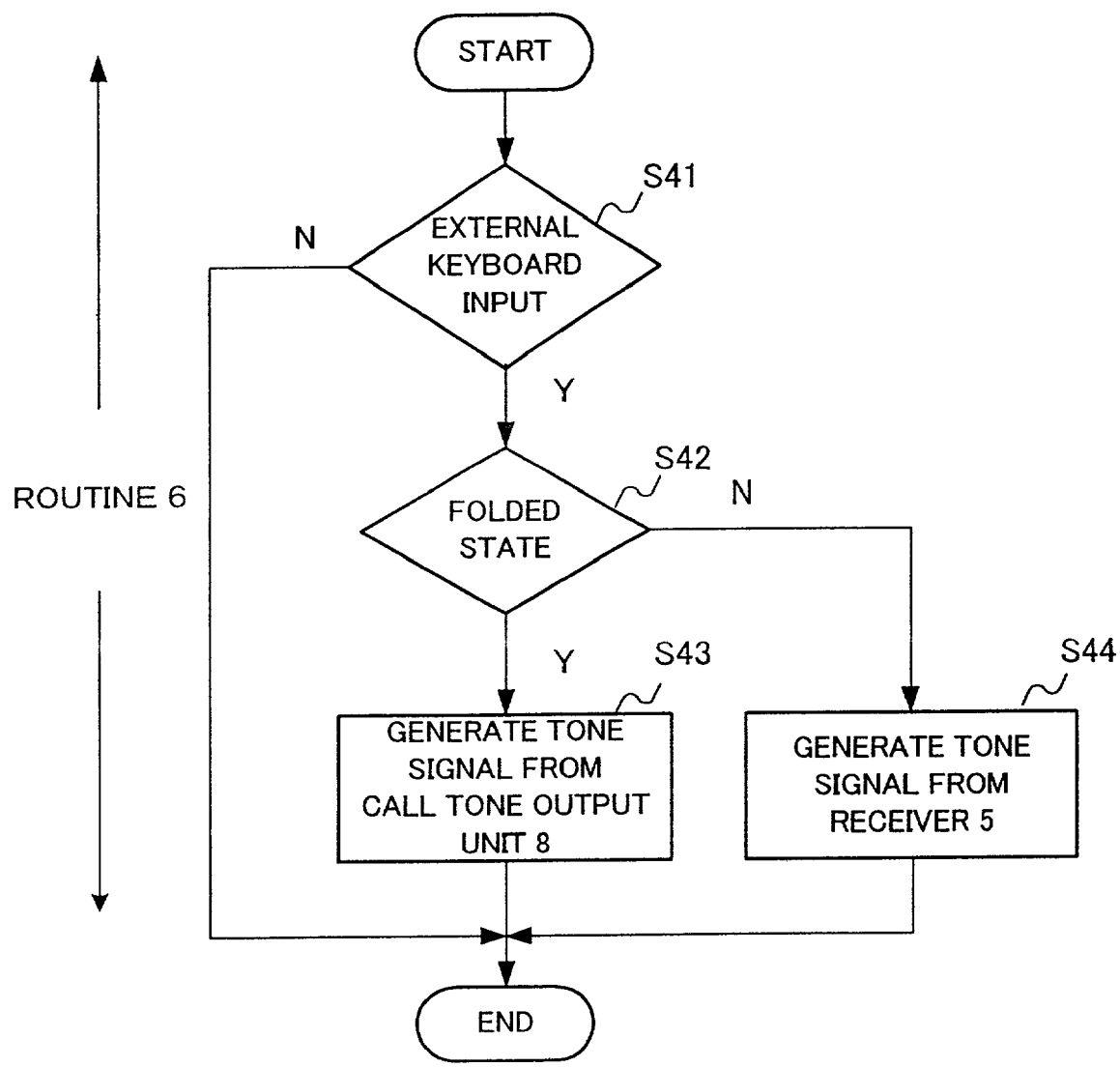
FIG. 6 is a flow chart for describing Routine 6 concerning the switch controller 20 in the controller 10 shown in FIG. 3.

FIG. 6 is a flow chart for describing Routine 6 concerning the switch controller 20 in the controller 10 shown in FIG. 3.

In this routine, the switch controller 20 in the controller 10 executes a step S41 of checking whether an input has been made from the keyboard 4. When no input has been made, an end is brought to the routine. When an input has been made, the switch controller 20 executes a step S42 of checking, according to the detection signal from the lead switch 14, whether the hinge 3 is in the unfolded state. When the hinge 3 is in the folded state, the switch controller 20 executes a step S43 of causing the call tone output from the call tone output unit 8. At this time, the call tone output from the receiver 5 is optional for the same reason as described before. Afterwards, an end is brought to the routine.

When the hinge 3 is in the unfolded state, the switch controller 20 causes the toe output from the receiver 5 in the step S44. At this time, the call tone output from the call tone output unit 8 is optional for the same reason as described before. Afterwards, an end is brought to the routine. More specifically, in the case of using an external keyboard, the switch controller 20 controls the switches 12, 18, 13 and 16 such as to cause confirmation tone output from the call tone output unit 8 when the hinge 3 is in the folded state and from the receiver 5 when the hinge 3 is in the unfolded state.

FIG. 7 is a view showing the correspondence relation between the status of the foldable portable telephone set and the tone output part at the call arrival time. As shown, the relations between the telephone set status and the tone output part at the call arrival time in Routines 1 to 4 are shown collectively to the end of deeper understanding.

FIG. 8 is a view showing the correspondence relation between the telephone set status and the tone output part when an input is made from keyboard. As shown, the relation between the telephone set status and the tone output part at the call arrival time in Routines 5 and 6 are show collectively to the end of deeper understanding.

As has been described in the foregoing, the call tone is outputted from the call tone output unit at the call arrival time when the hinge is in the folded state and a reception tone is outputted from the receiver when the hinge is in the unfolded state from the folded state. Since unfolding the foldable portable telephone set usually makes the display visible, it permits a call tone that is outputted at the call arrival time, generally at relatively as low sound level from the receiver provided at the same surface as the display, to be sufficiently recognized. That is, it is possible to reduce the loudspeaker drive amplifier lower consumption by switching the loudspeaker in the call tone output unit over to the lower output level loudspeaker in the receiver. It is thus possible to ensure sound pressure and reduce current in the loudspeaker drive amplified with respect to batteries which are reduced in size and current rating.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A call tone output system for a foldable portable telephone set having a hinge for being unfolded and folded, comprising:
    a detector for detecting the unfolding and folding of the hinge; and
    a tone output controller that causes tone output from a call tone output unit upon a call arrival when the hinge is in a folded state, and causes tone output from a receiver when the hinge is unfolded from the folded state.

2. The call tone output system for a foldable portable telephone set according to claim 1, wherein the tone output controller causes tone output from the receiver at the time of the tone output from the call tone output unit.

3. The call tone output controller for a foldable portable telephone set according to claim 1, wherein the tone output controller causes tone output from the call tone output unit at the time of the tone output from the receiver.

4. A call tone output system for a foldable portable telephone set having a hinge for being unfolded and folded, comprising:

a detector for detecting the unfolding and folding of the hinge; and a tone output controller that causes tone output from a call tone output unit upon a call arrival and causes tone output from a receiver when the hinge is unfolded from a folded state.

5. A call tone output system for a foldable portable telephone set having a hinge for being unfolded and folded, comprising:

a detector for detecting the unfolding and folding of the hinge; and a tone output controller that causes tone output from a call tone output unit upon a call arrival, when the hinge is in a folded state, an unfolded state, or when the hinge is folded from the unfolded state and that causes tone output from a receiver when the hinge is unfolded from the folded state.

6. The call tone output system for a foldable portable telephone set according to claim 5, wherein the tone output controller causes tone output from the receiver at the time of the tone output from the call tone output unit.

7. A call tone output system for a foldable portable telephone set having a hinge for being unfolded and folded, comprising:

a detector for detecting the unfolding and folding of the hinge; and a tone output controller that causes tone output from a call tone output unit upon a call arrival when the hinge is in a folded state, an unfolded state, or folded from the unfolded state and that causes tone output from a receiver when the hinge is unfolded from the folded state or when the hinge is folded from the unfolded state.

8. The call tone output controller for a foldable portable telephone set according to claim 7, wherein the tone output controller causes tone output from the call tone output unit at the time of the tone output from the receiver.

9. A call tone output method for a foldable portable telephone set having a hinge to be unfolded and folded, comprising:

detecting the unfolding and folding of the hinge; and outputting a call tone from a call tone output unit when a call arrives and the hinge is in a folded state; and outputting a reception tone from a receiver when a call arrives and the hinge is unfolded from the folded state.

10. A portable telephone set having two member bodies capable of being unfolded and folded, comprising:

a detector for detecting the unfolding and folding of the two member bodies; and a tone output controller that causes tone output from a call tone output unit upon a call arrival when the two member bodies are in a folded state, and that causes tone output from a receiver upon a call arrival when the two member bodies are unfolded from the folded state.

11. The portable telephone set according to claim 10, wherein the tone output controller causes tone output only from the call tone output unit when a call arrives in the unfolded state of the two member bodies.

* * * * *